United States Patent [19]

Lauer et al.

[11] 4,164,779

[45] Aug. 14, 1979

[54] ALUMINUM ELECTROLYTIC CAPACITOR FOR RATED VOLTAGES OF AT LEAST 160 V

[75] Inventors: Wilhelm Lauer, Giengen; Rudolf Soldner, Heidenheim, both of Fed. Rep. of Germany

[73] Assignee: Siemens Aktiengesellschaft, Berlin & Munich, Fed. Rep. of Germany

[21] Appl. No.: 824,506

[22] Filed: Aug. 15, 1977

[30] Foreign Application Priority Data

Sep. 17, 1976 [DE] Fed. Rep. of Germany ....... 2641939

[51] Int. Cl.² ............................................... H01G 9/00
[52] U.S. Cl. .................................... 361/433; 252/62.2
[58] Field of Search ........................ 252/62.2; 361/433

[56] References Cited

U.S. PATENT DOCUMENTS 3,293,506  12/1966  Chesnot .......................... 252/62.2 X

FOREIGN PATENT DOCUMENTS 303662  7/1971  U.S.S.R. .

Primary Examiner—Jack Cooper
Attorney, Agent, or Firm—Hill, Van Santen, Steadman, Chiara & Simpson

[57] ABSTRACT

A highly conductive operating electrolyte consisting of a mixture containing ethylene glycol, boric acid, adipic acid, ammonia, phosphoric acid and water for use in high power aluminum electrolytic capacitors, such as flashlight electrolytic capacitors.

1 Claim, 1 Drawing Figure

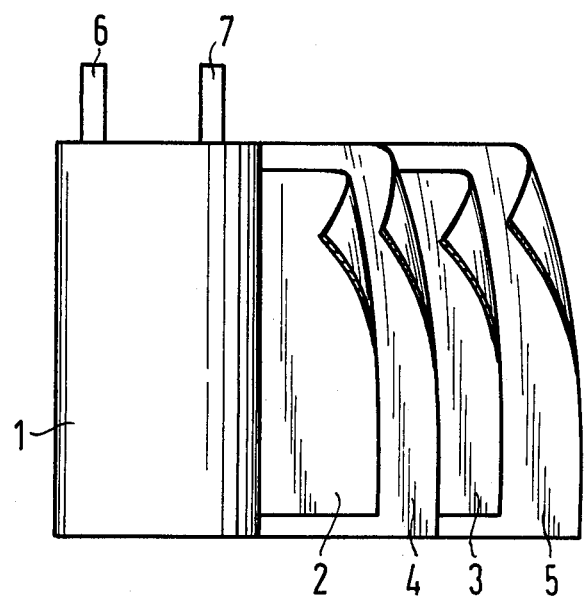

ALUMINUM ELECTROLYTIC CAPACITOR FOR RATED VOLTAGES OF AT LEAST 160 V

BACKGROUND OF THE INVENTION

1. Field of the Invention

The invention relates to electrolytic capacitors and somewhat more particularly to aluminum electrolytic capacitors for rated voltages of at least 160 volts.

2. Prior Art

Electrolytic capacitors are known and generally consist of wound-on layers of an anode foil, the surfaces of which may be roughened and which is provided with a dielectric oxide layer, a cathode foil and spacing means between the cathode and anode foil which is saturated with an operating electrolyte.

One of the facts which determines the light yield in flashlight devices is the dissipation factor of the utilized flashlight electrolytic capacitor. Thus, by reducing the dissipation factor, it is possible to increase the light yield.

On the other hand, in modern useage, there has been an increasing demand to reduce the size of components, i.e., in electrolytic capacitors to increase the capacitance per unit volume. One means of achieving an increased capacitance is by utilizing anode foils having surfaces roughened to a greater extent. However, increased foil roughness causes an increase in the dissipation factor of the electrolytic capacitors. It is also known that the conductivity of an operating electrolyte influences the ohmic components of the dissipation factors, since a higher conductivity results in a reduction of the dissipation factor. However, an increase in conductivity generally involves a reduction in breakdown voltage. Accordingly, the simultaneous presence of high conductivity and high breakdown voltage is contradictory.

Soviet Union Patent No. 303662 discloses an operating electrolyte for aluminum electrolytic capacitors consisting of a mixture of 10 to 120 parts by weight of ethylene glycol, 1 to 10 parts by weight of boric acid, 1 to 10 parts by weight of adipic acid, 2 to 10 parts by weight of ammonia and 1 to 2 parts by weight of phosphoric acid. However, this electrolyte does not exhibit sufficient conductivity to appropriately reduce the dissipation factor of electrolytic capacitors containing such electrolyte.

SUMMARY OF THE INVENTION

The invention provides an operating electrolyte for aluminum electrolytic capacitors with rated voltages of at least 160 volts, such as flashlight electrolytic capacitors, which exhibit as high a conductivity as possible at the requisite high breakdown voltage. The electrolyte produced in accordance with the principles of the invention facilitates the use of capacitor devices over a temperature range extending from about $-40°$ to $+85°$ C. and exhibits a low viscosity so that impregnation of a capacitor coil with such electrolyte is readily and rapidly achieved. Further, the electrolyte of the invention has excellent shelf-life since even when left standing for prolonged periods of time at room temperatures (i.e., as during production pauses, storage, etc.), the electrolyte does not crystallize. The electrolyte of the invention is relatively simple and economical to produce and does not contain any poisonous, combustible or otherwise dangerous components.

In accordance with the principles of the invention, each kilogram of an operating electrolyte contains 9.0 to 11.0 mols of ethylene glycol; 2.0 to 5.0 mols of boric acid; 0.1 to 0.5 mols of adipic acid; 0.05 to 0.15 mols of phosphoric acid; and 4.0 to 6.0 mols of water. Such electrolyte is impregnated into spacing means, such as paper strips or foils of an aluminum electrolytic capacitor, which consists of at least one wound layer of an anode foil, whose surfaces may be roughened and have a dielectric oxide layer thereon, at least one wound layer of a cathode foil and at least one electrolyte-impregnated spacing means positioned between the anode and cathode foils.

BRIEF DESCRIPTION OF THE DRAWINGS

The illustration is a side elevated view of a partially rolled-up electrolytic capacitor produced in accordance with the principles of the invention.

DESCRIPTION OF THE PREFERRED EMBODIMENTS

The invention provides a simple, economical and safe electrolyte for aluminum electrolytic capcitors having rated voltages $\geq 160$ V, such as flashlight electrolytic capacitors, which exhibits as high a conductivity as possible at the requisite high breakdown voltage. The electrolyte of the invention is useful over a temperature range of about $-40°$ to $+85°$ C. and exhibits a low viscosity so that it can readily impregnate a capacitor coil.

In accordance with the principles of the invention, a high-power aluminum electrolytic capacitor, such as a flashlight electrolytic capacitor, is comprised of wound layers of an anode foil, whose surfaces may be roughened and which is provided with a dielectric oxide layer, wound layers of a cathode foil and would layers of a spacer arranged between such anode and cathode foils and which is saturaged with an operating electrolyte, which for each kilogram of electrolyte contains 9.0 to 11.0 mols of ethylene glycol; 2.0 to 5.0 mols of boric acid; 0.1 to 0.5 mols of adipic acid; 0.9 to 1.5 mols of ammonia; 0.05 to 0.15 mols of phosphoric acid and 4.0 to 6.0 mols of water.

Quite unexpectedly, it was discovered that the operating electrolyte produced in accordance with the principles of the invention (i.e. an electrolyte containing water therein), yielded an increase in conductivity without a simultaneous reduction in breakdown voltage. Heretofore, it has been assumed that an increase in conductivity would materially lower the breakdown voltage of an operating electrolyte because, as is known from pertinent literature, breadown voltage is proportional to conductivity. However, and in contrast, at a breakdown voltage of 400 to 420 V, operating electrolytes produced in accordance with the princples of the invention exhibit conductivity values of up to 4.7 mS/cm at $+30°$ C. and 0.045 mS/cm at $-40°$ C. In comparing these values to prior art electrolytes, an improvement by a factor of 2 at $+30°$ C. and by a factor of 3 to 5 at $-40°$ C. is attained by the electrolytes of the invention and the temperature dependence of conductivity is simultaneously reduced.

In this discussion, breakdown voltage is defined as that voltage at which visible sparks first arise at 85° C. on a roughened and formed anode foil (cut edge, not formed) operationally coupled as an anode in an electrolyte.

The operating electrolytes produced in accordance with the principles of the invention are further characterized by resistance to crystallization (i.e., they do not tend to crystallize on storage or the like), which substantially simplifies the handling thereof during production since it is no longer necessary to re-dissolve such electrolytes, as by heating, which is typically required with prior art electrolytes of this type. Further, the increased amount of water and ethylene glycol within the electrolytes of the invention reduce the viscosity of such electrolytes to such an extent that a rapid impregnation is insured, even with relatively large capacitor coils.

Operating electrolytes corresponding to the principles of the invention, may be produced in an extremely simple manner since appropriate amounts of boric acid, adipic acid, ammonia, phosphoric acid and water can be stirred into the correct amount of ethylene glycol, which may be heated up to about 90° C. as aid in attaining a homogeneous or substantially homogeneous mixture. The boiling process typically utilized in formulating prior art high-power operating electrolytes is entirely dispensed with.

The operating electrolytes corresponding to the principles of the invention are further characterized by a low-cost production process and by the safeness of the starting materials employed.

With the foregoing general discussion in mind, there is now presented detailed examples which will illustrate to those skilled in the art, the manner in which the invention may be practiced. However, the examples are not to be construed as limiting the scope of the invention in any way.

EXAMPLE I

An operating electrolyte was produced in the manner described earlier so that it contained, with respect to each kilogram of electrolyte, 10.7 mols of ethylene glycol; 2.06 mols of boric acid; 0.49 mols of adipic acid; 1.09 mols of ammonia; 0.09 mols of phosphoric acid; and 6.0 mols of water. The conductivity of the so-attained electrolyte at +30° C. was 4.7 mS/cm and at −45° C. the conductivity was 0.045 mS/cm. Flashlight electrolytic capacitors were impregnated with this electrolyte and exhibited a nominal rating of 2700 μF and 385 V, and had dissipation factor, tan δ, of 8.4% (measured at 120 Hz) and an impedance, Z, of 0.33 ohms (measured at 10 kHz). The leakage current measurements, $I_{R1}$ and $I_{R5}$ (measured respectively for 1 and 5 minutes after coupling to the rated voltage) produced 2.70 and 0.86 mA, respectively.

EXAMPLE II

An operating electrolyte was produced in the manner described above so that it contained, with respect to each kilogram of electrolyte, 9.5 mols of ethylene glycol; 4.61 mols of boric acid; 0.18 mols of adipic acid; 1.06 mols of ammonia; 0.08 mols of phosphoric acid and 4.2 mols of water. The conductivity of the so-attained electrolyte at +30° C. was 3.6 mS/cm and at −40° C. was 0.024 mS/cm. Flashlight electrolytic capacitors impregnated with the instant electrolyte exhibited a nominal rating of 720 μF/360 V, had a dissipation factor, tan δ, of 4.6% and an impedance, Z, of 0.06 ohms. The leakage current measurements, $I_{R1}$ and $I_{R5}$ (measured as above), produced 1.06 and 0.49 mA, respectively.

EXAMPLE III

Electrolytic capacitors exhibiting a nominal rating of 22 μF/350 V were impregnated with an operating electrolyte having a substantially identical composition to that set forth in Example I above. The so-impregnated capacitors had a dissipation factor, tan δ, of 1.8% and an impedance, Z, of 0.7 ohms. The leakage current measurements, $I_{R1}$ and $I_{R5}$ (measured as above) produced 0.15 and 0.06 mA respectively.

EXAMPLE IV

An operating electrolyte was prepared in the manner described earlier so that it contained, with respect to each kilogram, 9.4 mols of ethylene glycol; 4.85 mols of boric acid; 0.18 mols of adipic acid; 1.38 mols of ammonia; 0.08 mols of phosphoric acid and 4.2 mols of water. The conductivity of the so-produced electrolyte was 4.3 mS/cm at +30° C. and 0.33 mS/cm at −40° C. Electrolytic capacitors were impregnated with the above electrolyte and exhibited a nominal rating of 22 μF/350 V, had a dissipation factor, tan δ, of 2.2% and an impedance of 0.6 ohms. The leakage current measurements $I_{R1}$ and $I_{R5}$ (measured as above) produced 0.13 and 0.05 mA respectively.

EXAMPLE V

Flashlight electrolytic capacitors were saturated with an operating electrolyte having an essentially identical composition to that described in Example II. The so-attained capacitors exhibited a nominal rating of 2000 μF/360 V and were subjected to electrodeless storage for 16 weeks at room temperatures. Every four weeks, intermediate measurements of capacitance, C, dissipation factor, tan δ, and leakage current $I_{R1}$ were taken. The results are tabulated below.

Table A

| Time In Weeks | C/μF | tan δ/% | $I_{R1}$/mA |
|---|---|---|---|
| 0 | 2011 | 10.3 | 2.9 |
| 4 | 1893 | 13.0 | 3.1 |
| 8 | 1845 | 13.7 | 3.4 |
| 12 | 1830 | 14.4 | 2.1 |
| 16 | 1870 | 14.2 | 2.2 |

In the drawings, an exemplary embodiment of a partially rolled-up electrolytic capacitor is illustrated. A capacitor 1 may be produced by arranging electrodes 2 and 3 so that they alternate with spacers 4 and 5 and winding the resulting arrangement into a coil structure. Current tabs 6 and 7 are operationally positoned on electrode foils 2 and 3 and the spacers 4 and 5 are impregnated or saturated with an operating electrolyte. The electrode foil which functions as an anode in the finished capacitor is provided with a dielectric layer, for example composed of aluminum oxide, which is applied to the foil during the formation process thereof. Preferably, although not necessarily, the surfaces of the anode foil are roughened prior to capacitance formation so as to achieve a higher capacitance. Depending on the ultimate use, the cathode foil may also be roughened and/or provided with a dielectric oxide layer. The spacers 4 and 5 are comprised of an absorbent material, such as paper, which is readily saturated or impregnated with an operative electrolyte formulated in accordance with the principles of the invention.

As it is apparent from the foregoing specification, the present invention is susceptible to being embodied with the various alterations and modifications which may differ particularly from those that have been described in the preceding specification and description. For this reason, it is to be fully understood that all of the foregoing is intended to be merely illustrative and is not to be construed or interpreted as being restrictive or otherwise limiting the present invention, excepting as it is set forth and defined in the hereto-appended claims.

We claim as our invention:

1. An aluminum electrolytic capacitor for rated voltages of at least 160 volts, comprising:

at least one wound layer of an anode foil;
at least one wound layer of a cathode foil; and
at least one wound layer of a spacer foil positioned between said anode and cathode foils;
  said spacer foil being saturated with an operating electrolyte consisting, for each kilogram of electrolyte, 9.0 to 11.0 mols of ethylene glycol; 2.0 to 5.0 mols of boric acid; 0.1 to 0.5 mols of adipic acid; 0.9 to 1.5 mols of ammonia; 0.05 to 0.15 mols of phosphoric acid and 4.0 to 6.0 mols of water.

* * * * *